United States Patent
Jain et al.

(10) Patent No.: US 12,362,946 B2
(45) Date of Patent: Jul. 15, 2025

(54) RECOMMENDATION SERVICE USING BLIND SIGNATURES

(71) Applicant: SAP SE, Walldorf (DE)

(72) Inventors: Shashank Mohan Jain, Bangalore (IN); Suchin Chouta, Udupi (IN); Srinivasa Reddy Challa, Guntur (IN)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 18/296,504

(22) Filed: Apr. 6, 2023

(65) Prior Publication Data

US 2024/0340187 A1   Oct. 10, 2024

(51) Int. Cl.
*G06F 21/60*   (2013.01)
*H04L 9/32*   (2006.01)

(52) U.S. Cl.
CPC .......... *H04L 9/3257* (2013.01); *G06F 21/602* (2013.01); *G06F 2221/2117* (2013.01)

(58) Field of Classification Search
CPC ................ H04L 9/3257; G06F 21/602; G06F 2221/21117
See application file for complete search history.

(56) References Cited

U.S. PATENT DOCUMENTS

| | | | | |
|---|---|---|---|---|
| 12,112,307 B1* | 10/2024 | Kurani | ................... | G06Q 30/04 |
| 2010/0325441 A1* | 12/2010 | Laurie | ................... | H04L 9/3257 713/185 |
| 2021/0312026 A1* | 10/2021 | Rose | ................... | G06Q 20/065 |
| 2021/0389854 A1* | 12/2021 | Rose | ................... | G06F 3/0482 |
| 2021/0406386 A1* | 12/2021 | Ortiz | ................... | G06N 20/00 |
| 2022/0108026 A1* | 4/2022 | Ortiz | ................... | G06F 12/1441 |
| 2022/0398340 A1* | 12/2022 | Jakobsson | ................... | H04L 9/30 |
| 2023/0043318 A1* | 2/2023 | Selman | ................... | G06F 21/6209 |
| 2023/0169208 A1* | 6/2023 | Blaikie, III | ................... | G06F 21/6245 726/27 |
| 2024/0104177 A1* | 3/2024 | Kaidi | ................... | G06Q 30/0279 |

(Continued)

OTHER PUBLICATIONS

Extended European Search Report dated Nov. 21, 2023 which was issued in connection with European Patent Application No. 23194465.3.

(Continued)

*Primary Examiner* — Stephen T Gundry
(74) *Attorney, Agent, or Firm* — Buckley, Maschoff & Talwalkar LLC

(57) ABSTRACT

An onboarding request is received from a user to utilize a recommendation service. The onboarding request contains personal data (including an onboarding user identifier and a serial number requesting a stated number of credits), encrypted with a commuting function C, along with clear text account details. A blind trust is established with the user, and the recommendation service signs the onboarding request with a signing function S and sends the signed onboarding request to the user to perform a blind onboarding of the user. A consumption request is then received (e.g., a call to get recommendations) from the user including a consumption user identifier and an approved credits document. The recommendation service can then update a user-item matrix that maps user identifiers with available items and transmit an item recommendation to the user, based on the user-item matrix, and expire the approved credits document by a consumption amount.

17 Claims, 13 Drawing Sheets

(56) References Cited

U.S. PATENT DOCUMENTS

| | | | |
|---|---|---|---|
| 2024/0135006 A1* | 4/2024 | McFarland, Jr. | H04L 9/50 |
| 2024/0152645 A1* | 5/2024 | Blaikie, III | G06Q 20/123 |
| 2024/0308513 A1* | 9/2024 | Gupta | B60W 40/02 |
| 2024/0320639 A1* | 9/2024 | Kolchin | G06Q 20/02 |
| 2024/0321466 A1* | 9/2024 | Pottie | G16H 70/20 |
| 2024/0330376 A1* | 10/2024 | Solh | G06F 16/951 |
| 2024/0362666 A1* | 10/2024 | Hobbs | G06Q 40/06 |
| 2024/0378589 A1* | 11/2024 | Kolchin | G06Q 20/0855 |
| 2024/0412210 A1* | 12/2024 | Tai | G06Q 20/1235 |
| 2024/0420110 A1* | 12/2024 | Kurani | G06F 9/541 |
| 2025/0005557 A1* | 1/2025 | Kolchin | G06Q 20/389 |
| 2025/0022002 A1* | 1/2025 | Narula | G06Q 20/363 |

OTHER PUBLICATIONS

Friedman Arik et al: "Privacy Aspects of Recommender Systems" In: "Recommender Systems Handbook", Jan. 1, 2015 (Jan. 1, 2015), Springer us, Boston, MA, XP093098460, ISBN: 978-1-4899-7637-6 pp. 649-688, DOI: 10.1007/978-1-4899-7637-6_19, Retrieved from the Internet: URL:https://shlomo-berkovsky.github.io/files/pdf/Springer15b.pdf> p. 664-p. 665.

Anonymous: "What is SEPA Direct Debit?", Apr. 25, 2022 (Apr. 25, 2022), XP093098472, Retrieved from the Internet: URL:https://web.archive.org/web/20220425131432/https://gocardless.com/guides/sepa/in troduction/ [retrieved on Nov. 6, 2023] * p. 1-p. 7 *.

Christian Desrosiers et al: "A Comprehensive Survey of Neighborhood-based Recommendation Methods" In: "Recommender Systems Handbook", Jan. 1, 2011 (Jan. 1, 2011), Springer US, Boston, MA, XP055099925, ISBN: 978-0-38-785820-3 pp. 107-144, DOI: 10.1007/978-0-387-85820-3_4, abstract *p. 25-p. 28.

* cited by examiner

Items

|   | 1 | 2 | 3 | ... | i | ... | m |
|---|---|---|---|---|---|---|---|
| 1 | 5 | 3 |   |   | 1 | 2 |   |
| 2 |   | 2 |   |   |   |   | 4 |
| 3 |   |   | 5 |   |   |   |   |
| ⋮ |   |   |   |   |   |   |   |
| u | 3 | 4 |   |   | 2 | 1 |   |
| ⋮ |   |   |   |   |   | 4 |   |
| n |   |   |   |   | 3 | 2 |   |

Users

*FIG. 2*

| Item ID | Name | Description | Type | Color | Price |
|---|---|---|---|---|---|
| ~~~~~ | ~~~~~ | ~~~~~ | ~~~~~ | ~~~~~ | ~~~~~ |
| ~~~~~ | ~~~~~ | ~~~~~ | ~~~~~ | ~~~~~ | ~~~~~ |
| ~~~~~ | ~~~~~ | ~~~~~ | ~~~~~ | ~~~~~ | ~~~~~ |
| ~~~~~ | ~~~~~ | ~~~~~ | ~~~~~ | ~~~~~ | ~~~~~ |
| ~~~~~ | ~~~~~ | ~~~~~ | ~~~~~ | ~~~~~ | ~~~~~ |

*FIG. 3*

RECOMMENDATION SERVICE USING BLIND SIGNATURES

BACKGROUND

Traditional computing system architectures include one or more servers executing applications which access data stored in one or more database systems. The servers may be located on-premises and/or in a cloud-based datacenter. Users may interact with such applications to view, create, and update the data in accordance with functionality provided by the applications.

Due to the sophistication and plethora of options provided by modern applications, it is often desirable to guide a user's selection of an item or option provided by an application. An application may present such guidance to a user as a recommendation that has been generated by a cloud-based recommendation service. In one non-exhaustive example, a user may operate an online shopping application to browse for products and the application may present one or more recommended products to the user during the browsing. In another example, an application presents recommended software add-ons to a system administrator. The recommended products and add-ons may be determined by the application or by a recommendation service which is accessed by the application.

The determination of recommendations might be based on, for example, the actions of a user and/or the identification of common characteristics between a first item (e.g., a product viewed by the user) and candidate items (e.g., all other available products). Characteristics may comprise categorical and/or free text data, for example, and therefore require systems for establishing similarities based on multiple disparate data types. Characteristics may also include user activity with respect an item, which further complicates the creation of recommendations by a service.

With the proliferation of recommendation services and their consumption by users, the preservation of privacy has become a very challenging task. Currently, when a user undergoes an onboarding process, the user is assigned a user identifier. As a result, the user (if he or she uses a recommendation service) can be tracked not only regarding use of current system but might also be susceptible to linkage attacks across different systems. If the system anonymizes the user, however, the system may be unable to generate recommendations that are based on, for example, a user-item matrix decomposition mechanism. There are proposals to use a hash instead of a user identifier, but this again can be traced back as a mapping between users and the hashes need to be maintained.

Systems are desired that facilitate the determination of recommendations while preserving privacy.

BRIEF DESCRIPTION OF THE DRAWINGS

FIG. 2 is a user-item matrix in accordance with some embodiments.

FIG. 3 is a tabular representation of item metadata according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

Briefly, some embodiments provide a recommendation system which efficiently makes recommendations while maintaining user anonymity. Embodiments may support the addition of new items and new users without risking the privacy of users.

Figure 1:
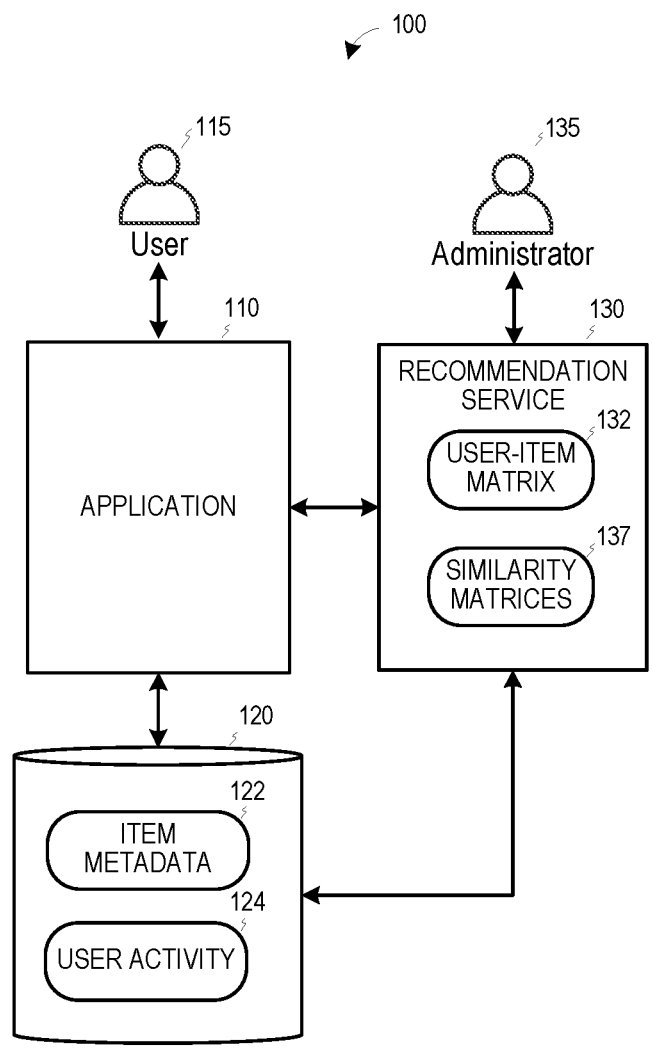
FIG. 1 is a block diagram of an architecture to determine item recommendations and provide item recommendations to a user according to some embodiments.

FIG. 1 is a block diagram of an architecture of system 100 according to some embodiments. The illustrated elements of system 100 may be implemented using any suitable combination of computing hardware and/or software that is or becomes known. Such a combination may include implementations which apportion computing resources elastically according to demand, need, price, and/or any other metric. In some embodiments, two or more elements of system 100 are implemented by a single computing device. Two or more elements of system 100 may be co-located. One or more elements of system 100 may be implemented as a cloud service (e.g., a Software-as-a-Service or a Platform-as-a-Service).

Application 110 may comprise any suitable software application providing functionality to one or more users such as user 115. Application 110 may be a component of a suite of applications provided by an application provider. Application 110 may be executed by an application platform comprising an on-premise, cloud-based, or hybrid hardware system providing an execution platform and services to software applications. Such an application platform may comprise one or more virtual machines executing program code of an application server. All software applications described herein may comprise program code executable by one or more processing units (e.g., Central Processing Units ("CPUs"), processor cores, and processor threads) of an application platform to provide various functions.

Application 110 may provide such functions in conjunction with database system 120, which may be standalone, distributed, in-memory, column-based and/or row-based as is known in the art. Database system 120 may comprise any query-responsive system for persisting data. Database system 120 may be implemented by a database server including a database management system (not shown) providing functions for configuration, maintenance, monitoring, etc. of the data stored therein. In this regard, the data stored in database system 120 may comprise database tables conforming to a schema defined by metadata which is also stored in database system 120.

According to the present example, application 110 allows users such as user 115 to view and select items. An item may represent any good, service, or other option. Each item is associated with item metadata 122 stored within database system 120. Moreover, the application 110 communicates with a recommendation service 130 that includes a user-item matrix. For example, FIG. 2 is a user-item matrix 200 in accordance with some embodiments. The user-item matrix 200 includes columns 1 through m, with column i being associated with a particular item and rows 1 through n, with row u being associated with a particular user. The user-item matrix 200 may represent a sparse matrix of values associated with a probable affinity of each user toward each item.

FIG. 3 is a tabular representation of portion 300 of item metadata 122 according to some embodiments. Each row of portion 300 represents a consumer product and includes a corresponding product identifier, name, description, product type, color and price. Other possible properties include dimension, weight, region of origin, etc. In a case that the items are software components such as but not limited to Application Programming Interfaces ("APIs"), integrations, and data services, item metadata 122 may comprise, for example, a component identifier, name, description, compatibility information, industries, and lines of business. Embodiments are not limited to either of the above two examples.

During operation of application 110, user 115 interacts with user interfaces provided by application 110. In some embodiments, such user interfaces comprise a client User Interface ("UI") component of software code which is downloaded to a Web browser operated by user 115 and is executed thereby. The client UI component communicates with a server component based on the user interactions.

Application 110 may thereby acquire data representing user activities with respect to the user interfaces (while preserving user privacy). These activities are recorded in user activity data 124. User activities may include but are not limited to selecting a displayed item (e.g., via a mouse-click), "liking" an item (e.g., via selection of a corresponding icon adjacent to the item), hovering a cursor over a graphic for a particular length of time, viewing a web page associated with a given item for a particular length of time, selecting a UI control, selecting a drop-down menu, and inputting text into a field.

Recommendation service 130 may operate as described herein to generate item recommendations. Recommendation service 130 may comprise a service (e.g., cloud-based) accessed by application 110 to request such recommendations, but embodiments are not limited thereto. For example, a recommendation service according to some embodiments may be integrated within application 110. By providing recommendation service 130 as a stand-alone service, recommendation service 130 may be accessed by disparate applications associated with different types of items to provide application-specific item recommendations to each of such applications. A stand-alone service also reduces overhead on the actual application which provides item recommendations to the user.

For a given application (e.g., application 110), recommendation service 130 may generate similarity matrices 137 based on item metadata 122, user data, and/or user-item interaction data (e.g., user activity data 124). Similarity matrices 137 might comprise, for example, graphs in which each item of item metadata 122 is represented by a node and a similarity between any two items is represented by the weight of an edge between the nodes corresponding to the items. Recommendation service 130 may therefore determine items which are most-similar to a given item based on the weights of each edge connected to the node of the given item.

Administrator 135 may access a user interface provided by recommendation service 130 to provide configuration thereof. Configuration may comprise authorizing one or more applications to access recommendation service 130. Administrator 135 may also customize the determination of item recommendations as executed by recommendation service 130. Such customizing may include, but is not limited to, customizing weights associated with each property of item metadata 122, initial user action values, and/or similarity score thresholds.

Figure 4:
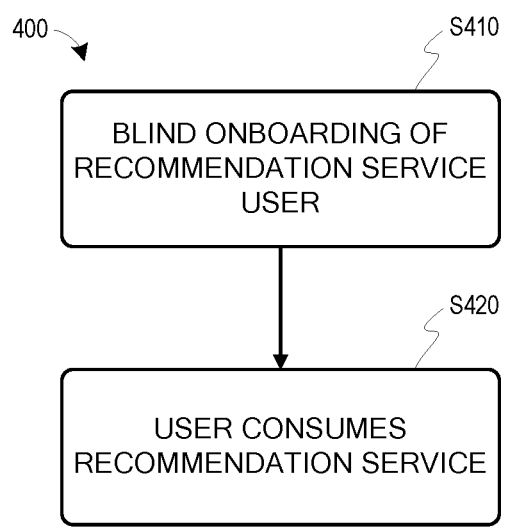
FIG. 4 is an overall method in accordance with some embodiments.

FIG. 4 comprises an overall flow diagram of process 400 to provide item recommendations according to some embodiments. Process 400 will be described below 4 as if executed by recommendation service 130, but embodiments are not limited thereto.

Process 400 and all other processes mentioned herein may be embodied in processor-executable program code read from one or more of non-transitory computer-readable media, such as, for example, a hard disk drive, a volatile or non-volatile Random Access Memory ("RAM"), a DVD-ROM, a Flash drive, and a magnetic tape, and then stored in a compressed, uncompiled and/or encrypted format. A processor may include any number of microprocessors, microprocessor cores, processing threads, or the like. In some embodiments, hard-wired circuitry may be used in place of, or in combination with, program code for implementation of processes according to some embodiments. Embodiments are therefore not limited to any specific combination of hardware and software. At S410, a "blind" onboarding of a recommendation service user is performed (described in more detail with respect to FIGS. 5 and 6). As a result, the user can later consume the recommendation service at S420 while maintaining their privacy (described in more detail with respect to FIGS. 7 and 8).

As will be described, as used herein the term "blind" or "blind signatures" may be associated with the protocol proposed by David Chaum in the context of cloud services (also referred to as "Chaumian binding"). Blind signatures are a technique for carrying out a transaction, without revealing who all are present at both sides of the transaction, the time of transaction, or the contents of the transaction even to the centralized figure who approves the transaction. The main functions associated with the Chaum mechanism are:

A signing function S which is only known to the signer of the transaction, in this case, a recommendation service provider. It has a corresponding inverse function S' which is publicly known.

A commuting function C and its inverse C' are both known only to the end user. The commuting function C and its inverse C' created in such a way that:

$$C'(s(C(x))) \rightarrow S(x)$$

According to some embodiments, a redundancy checking predicate r may also be provided.

The user may utilize the commuting function C to encrypt personal data, such as a user identifier, user age, and a serial number representing credits (e.g., 100 credits that lets the user access results of recommendation service times), etc. and sends encrypted information to the recommendation services provider along with clear text (e.g., unencrypted) account details. The service provider does a blind trust (explained in connection with FIGS. 9 and 10) and signs the document sent by the user (and also deducts money from the user account). Note that only account details arrive in clear text and the provider is unable to see the personal data. After the blind trust is established, the document is signed using the function S and sent back to the user. The user then applies the inverse of commuting function S'. Via mathematical properties, this means that S and S' cancel each other out, and the original document now has the signature of the recommendation service provider. In this way, the user can obtain 100 credits for the recommendation service without exposing any personal details, such as a user identifier, age, etc. to the recommendation provider.

Figure 5:
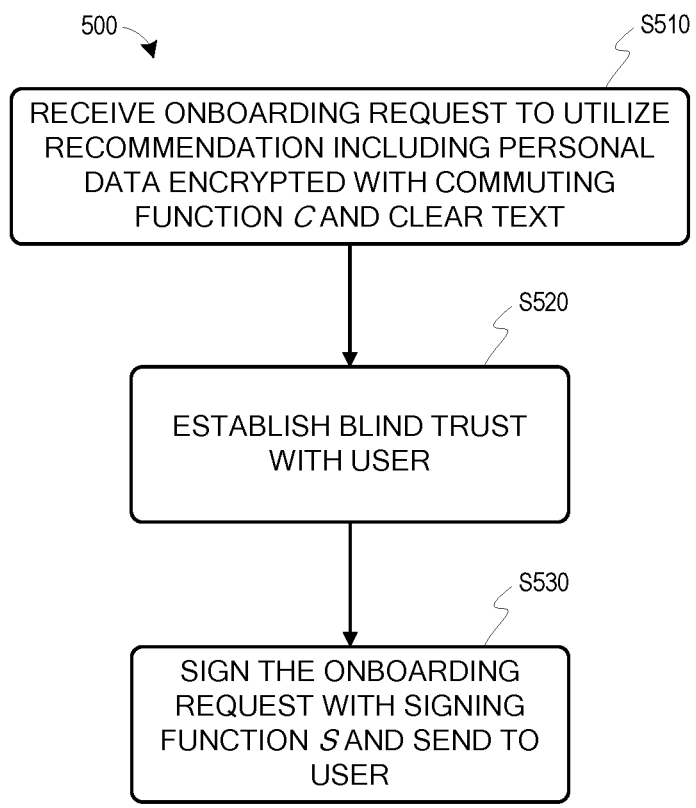
FIG. 5 is an onboarding method according to some embodiments.

FIG. 5 is an onboarding method 500 according to some embodiments. At S510, a recommendation service may receive, from a user, an onboarding request to utilize the recommendation service. The onboarding request includes personal data (such as an onboarding user identifier and a serial number requesting a stated number of credits) encrypted with a commuting function C along with clear text account details. Note that the commuting function C and an inverse commuting function C' are only known to the user. Moreover, $C'(S(C(x))) \rightarrow S(x)$. According to some embodiments, the encrypted personal data received from the user further can include a user name, a user address, a user age, a user preference (e.g., indicating what types of items should be recommended), etc. At S520, the recommendation service establishes a blind trust with the user.

After the blind trust is established, the recommendation service signs the onboarding request with a signing function S at S530 and sends the signed onboarding request to the user to perform a blind onboarding of the user to the recommendation service. Note that the signing function S is only known to the recommendation service and an inverse signing function S' is publicly known. The user may then apply the inverse signing function S' to the signed request sent from the recommendation service to obtain an approved credits document, without encryption, signed by the recommendation service.

Figure 6:
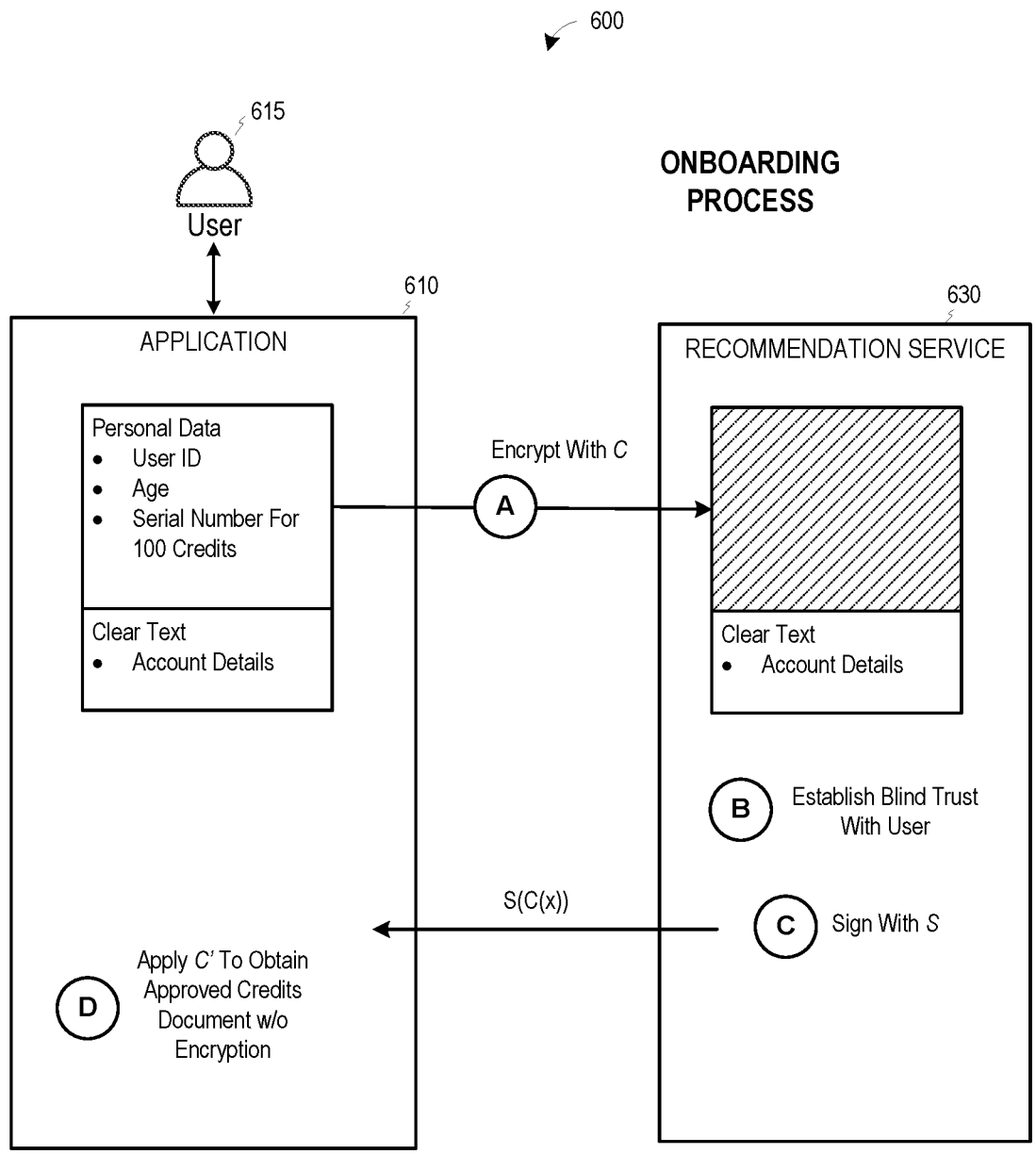
FIG. 6 is an example of onboarding in accordance with some embodiments.

FIG. 6 is an example 600 of onboarding in accordance with some embodiments. At (A), a recommendation service 630 receives, from a user 615 via an application 610, an onboarding request to utilize the recommendation service 630. The onboarding request includes personal data (such as an onboarding user identifier and a serial number requesting a stated number of credits such as 100 credits) encrypted with a commuting function C (as illustrated by cross-hatching in FIG. 6) along with clear text account details. At (B), the recommendation service 630 establishes a blind trust with the user 615. After the blind trust is established, the recommendation service 630 signs the onboarding request with a signing function S at (C) and sends the signed onboarding request S (C (x)) to the user 615 to perform a blind onboarding of the user to the recommendation service 630. Note that the signing function S is only known to the recommendation service and an inverse signing function S' is publicly known. The user 615 may then apply the inverse signing function S' to the signed request at (D) sent from the recommendation service 630 to obtain an approved credits document, without encryption, signed by the recommendation service 630.

Figure 7:
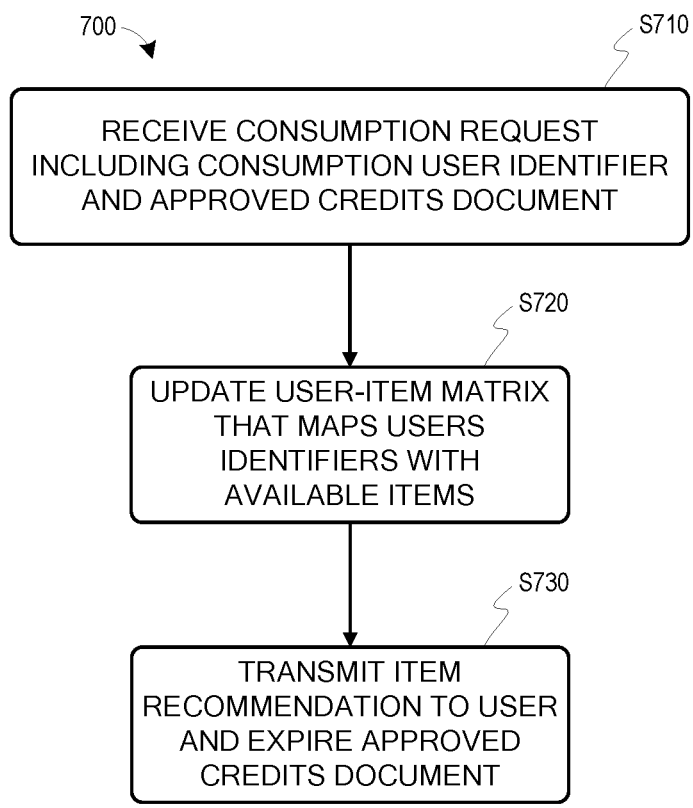
FIG. 7 is a consumption method according to some embodiments.

Now that the user has the approved credits document that was created as part of a blind onboarding, he or she may start browsing the items on a web site. For example, FIG. 7 is a consumption method 700 according to some embodiments.

At S710, the recommendation service may receive, from the user, a consumption request including a consumption user identifier and an approved credits document signed by the recommendation service. Note that the service provider only sees a user identifier and the credit document serial number (which is signed by the provider itself) and therefore treats them as a valid user. The recommendation service provider has no way to link it to the other onboarding details such as the user's age, address, bank account, etc. In this way, embodiments may provide a means to delink the user details from the transactional usage of a user identifier.

The user identifier and an item together can now be used to create a user-item matrix across users who access the recommendation mechanism. Thus, at S720 the service may update a user-item matrix that maps user identifiers with available items. At S730, the system may transmit an item recommendation to the user, based on the user-item matrix, and expiring the approved credits document by a consumption amount. That is, when a user clicks on an item the recommendation algorithm recommends for that user identifier other items that may be of interest without knowing who the user is. Each time the user consumes the service, the system can expire the serial number of the approved credits document that was used to access the service. This is tantamount to a usage of that "currency" (that is, the credits can be considered as a currency that is "spent" by the user to purchase recommendations from the service) and thereby a certain amount of credit may be deducted (and the system cannot trace this back to the onboarding details because at that time the recommendation service provider performed a blind signing of the request).

Figure 8:
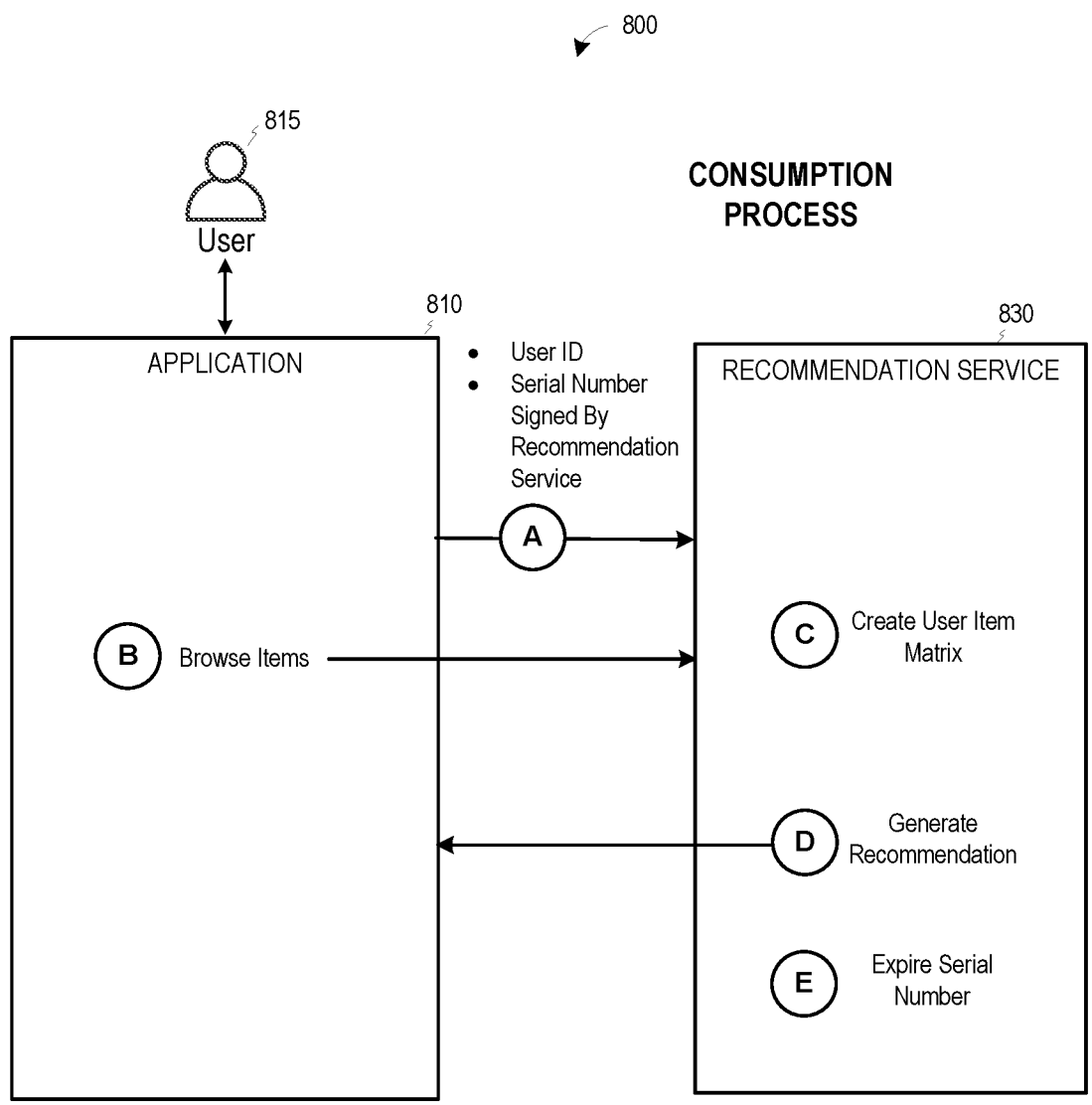
FIG. 8 is an example of consumption in accordance with some embodiments.

FIG. 8 is an example 800 of consumption in accordance with some embodiments. At (A), an application 810 sends a user identifier to a recommendation service 830 along with a serial number signed by the recommendation service 830 (via an approved credits document that was created as part of a blind onboarding). A user 815 may then browse items via the application 810 at (B) and the recommendation service 830 creates/updates a user-item matrix at (C). The user-item matrix can be used generate recommendations which are provided to the application 810 at (D). The recommendation service 830 may then expire the applicable serial number at (E) (e.g., by a consumption amount).

One remaining problem with the proposed solution is the question "Why will the recommendation service provider do a blind signing of a document?" That is, how will the recommendation service provider be convinced that the document (which it cannot read) is not trying to cheat the system by indicating that it is asking for 100 credits when, in fact, it is asking for 1,000 credits? To overcome this, a blind trust may involve a user sending a batch of similar encrypted documents—with different user identifiers and serial numbers—that all ask for same amount of credits (e.g., a batch of 100 documents that each ask for 100 credits). The recommendation service provider can then request the inverse commuting functions C' for 99 of those documents. With the 99 inverse commuting functions C', the recommendation service provider can decrypt and read the data to verify that all of the 99 documents do if fact ask for same amount of credits (e.g., 100 credits in this example). If this is not true (e.g., some of the documents might ask for 1,000 credits), the user is trying to cheat the system and the request is rejected. If the recommendation service sees that all 99 document ask for the same number of credits, it can assume with high probability that the 100th document is also asking for same amount. In this case, the recommendation service provider can blindly sign that document (which has not been decrypted) and reduce from the user's account an amount equivalent to 100 credits.

Figure 9:
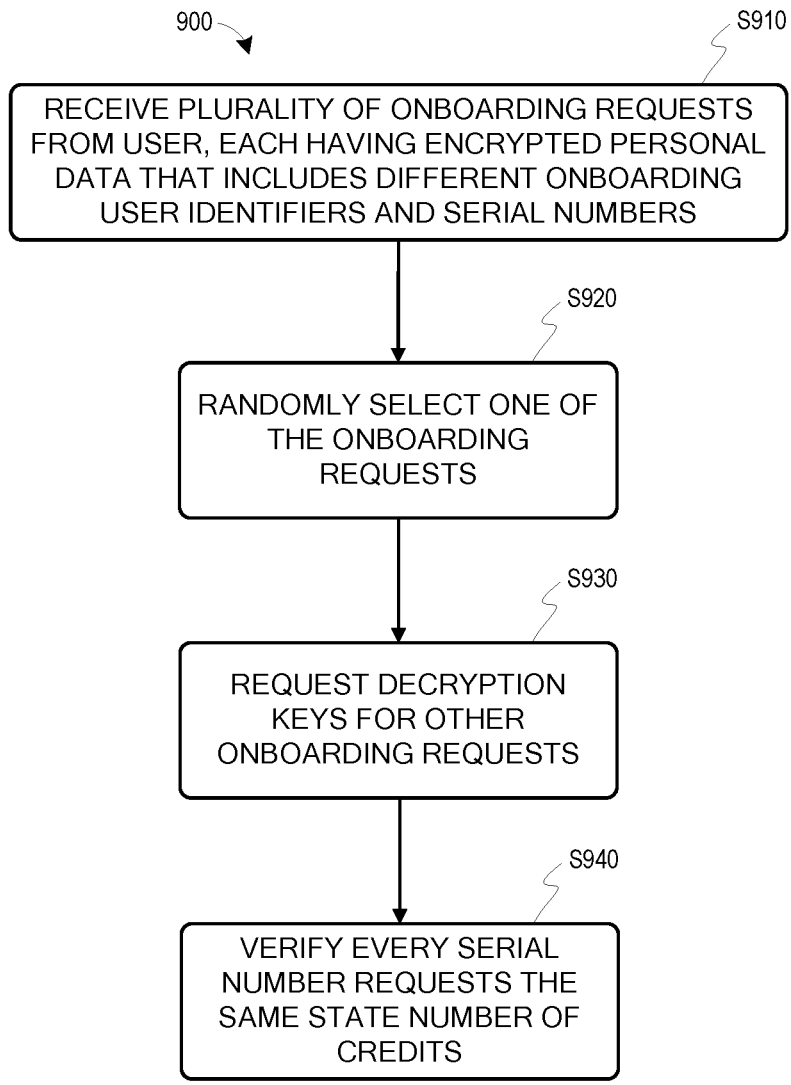
FIG. 9 is a blind trust method according to some embodiments.

FIG. 9 is a blind trust method 900 according to some embodiments. At S910, a recommendation service provider receives, from a user, a plurality of onboarding requests to utilize the recommendation service. Each onboarding request including personal data, with different onboarding user identifiers and serial numbers requesting the stated number of credits, encrypted with a commuting function C. At S920, the recommendation service provider randomly selects one of the plurality of onboarding requests. At S930, the recommendation service provider requests, from the user, decryption keys for all of the plurality of onboarding requests except the randomly selected one. At S940, the recommendation service provider verifies that every serial number requests the same stated number of credits. If so, the randomly selected onboarding request is signed with the signing function S and is sent to the user to perform a blind onboarding of the user to the recommendation service.

Figure 10:
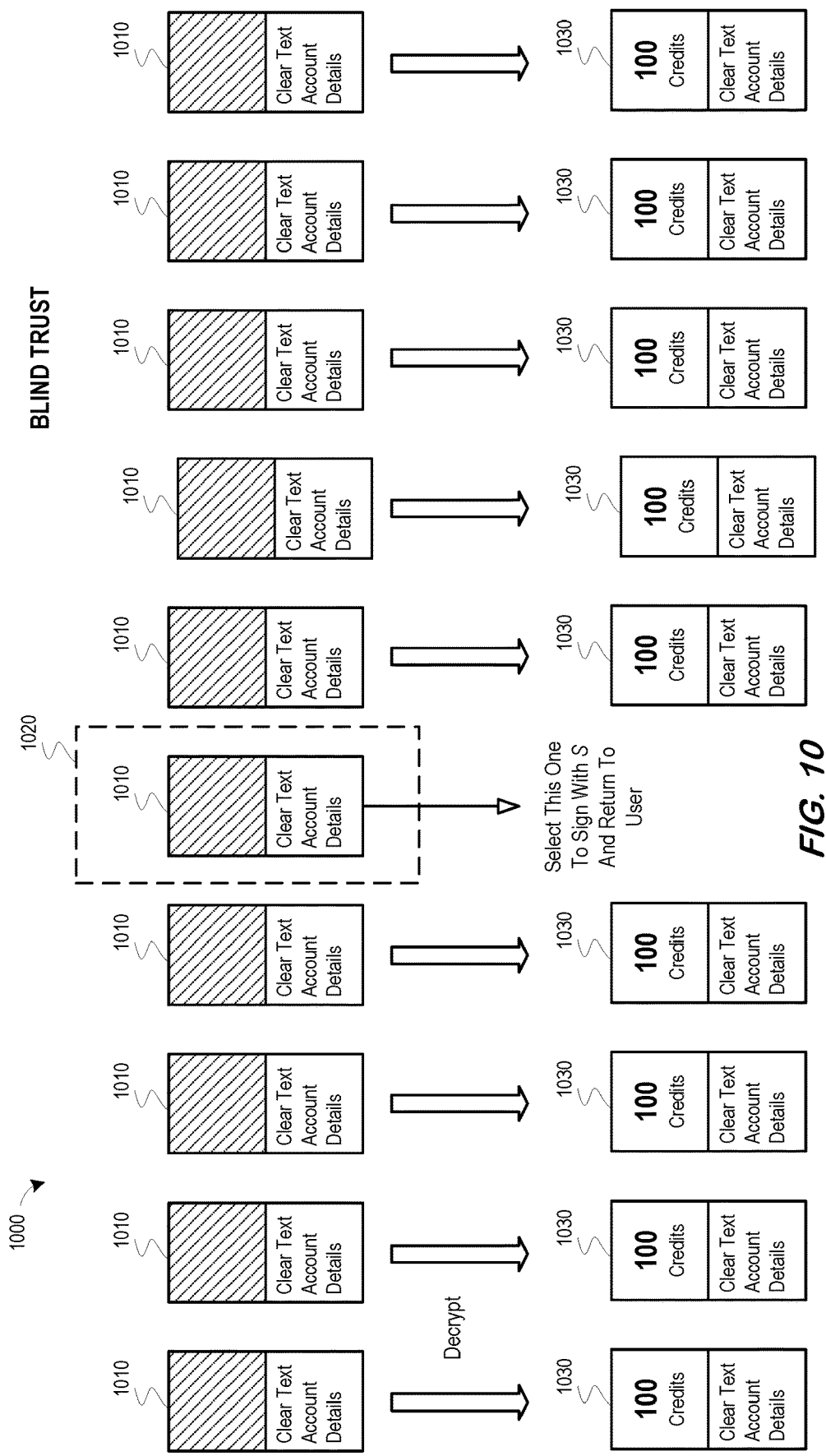
FIG. 10 is an example of a blind trust in accordance with some embodiments.

FIG. 10 is an example 1000 of a blind trust in accordance with some embodiments. Initially, a recommendation service provider receives, from a user, ten onboarding requests 1010 to utilize the recommendation service. Although ten requests 1010 are used herein as an example, embodiments may be performed using any number of such requests 1010 (e.g., the user might send 1,000 requests). Each onboarding request 1010 includes personal data, with different onboarding user identifiers and serial numbers requesting 100 credits encrypted with a commuting function C (illustrated with cross-hatching in FIG. 10) along with clear text account details. The recommendation service provider randomly selects one of onboarding requests 1020 (illustrated by dashed box in FIG. 10). The recommendation service provider requests, from the user, decryption keys for all of the onboarding requests 1010 except the randomly selected one 1020. The recommendation service provider decrypts the nine requests 1030 and verifies that every serial number requests 100 credits. If so, the randomly selected onboarding request 1020 is signed with the signing function S and is sent to the user to perform a blind onboarding of the user to the recommendation service.

Figure 11:
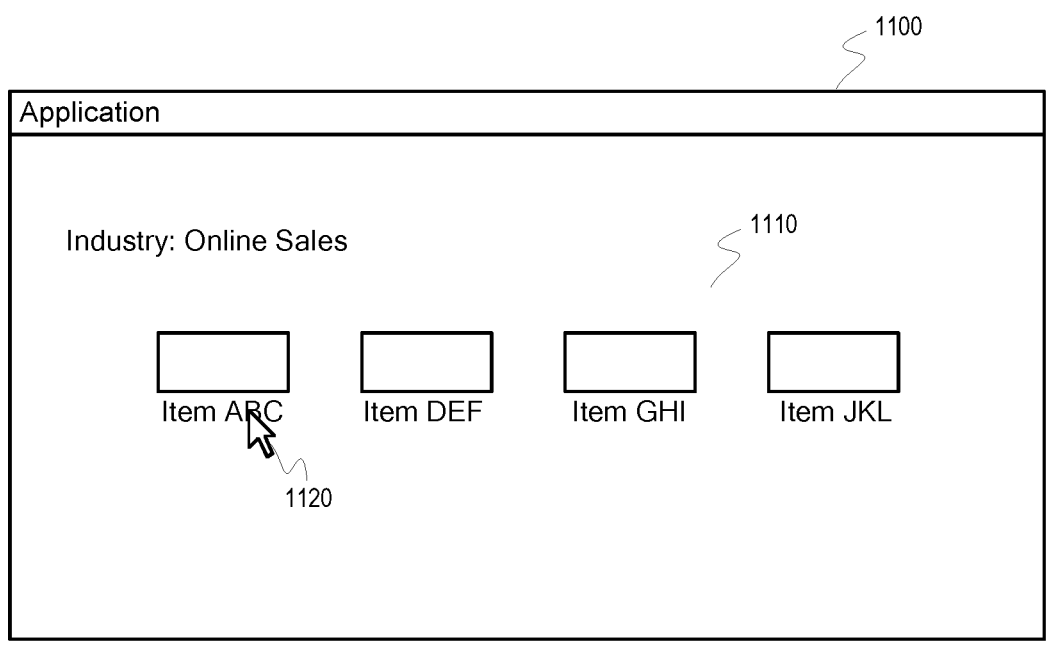
FIG. 11 is a user interface for browsing items according to some embodiments.

User interface 1100 of FIG. 11 is an example user interface of an application according to some embodiments. User interface 1100 may be presented by a Web browser of a user device operated by a user. The Web browser may execute a UI client application associated with a back-end (e.g., cloud-based) UI server application as is known in the art. Embodiments are not limited to such an application and/or architecture.

Figure 12:
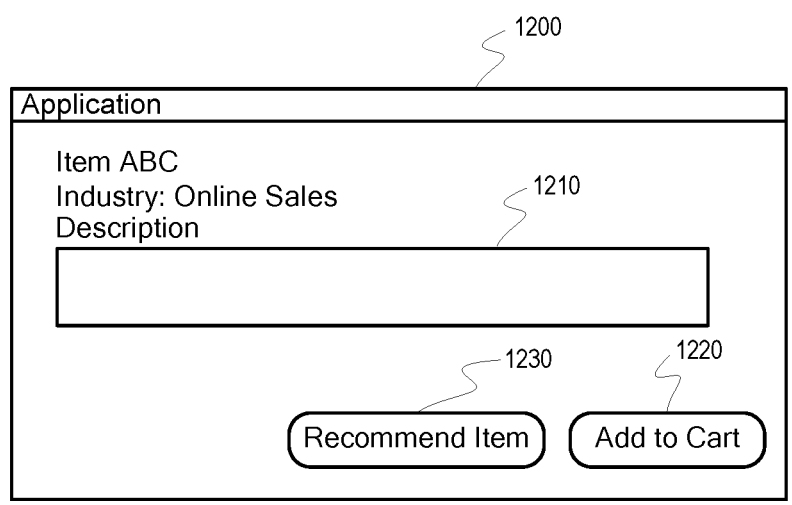
FIG. 12 is a user interface showing item metadata according to some embodiments.

User interface 1100 includes selectable controls 1110, each of which is associated with a particular item. The user has moved cursor 1120 over the control corresponding to Item ABC and selected the control, causing presentation of user interface 1200 of FIG. 12. User interface 1200 provides metadata 1210 of selected Item ABC, which may be retrieved from item metadata 122 in order to generate user interface 1200.

User interface 1200 includes control 1220 which is selectable to associate Item ABC with a shopping cart. Addition of an item to a shopping cart, as is known in the art, allows initiation of a checkout process for purchasing the item. User interface 1200 also provides control 1230. The user may select control 1230 to issue a request for a recommendation of one or more recommended items. The request may be passed from the application to a recommendation service, where it is received without revealing the user's personal information.

It will be assumed that the user is not logged in to the application, so the received request is associated with Item ABC only. Accordingly, at S710, recommended items are determined based on a user-item matrix and/or a similarity matrix which associates Item ABC with each of a plurality of other items. As described above, the user-item matrix may be updated without knowing the personal details of the identity of the user.

Figure 13:
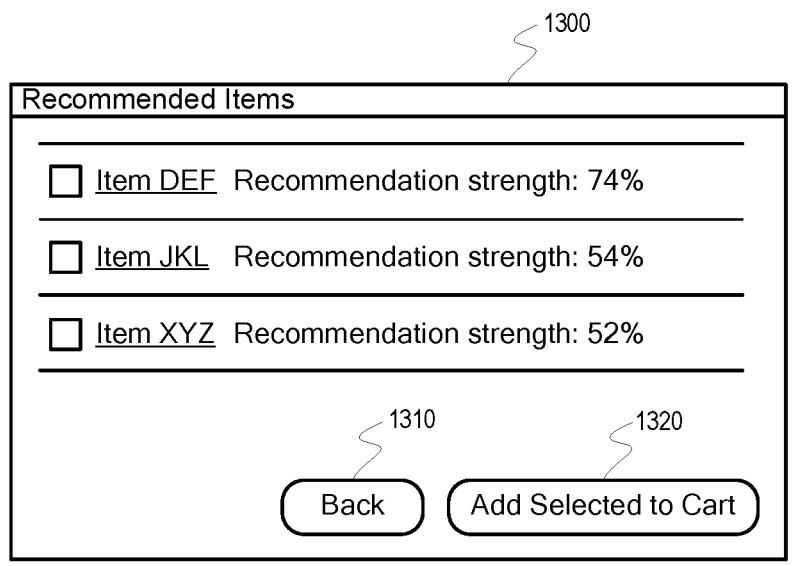
FIG. 13 is a user interface showing recommended items according to some embodiments.

FIG. 13 is a view of user interface 1300 to present recommended items according to some embodiments. Embodiments are not limited to a user interface such as interface 1300. Interface 1300 shows three determined recommended items adjacent to selectable checkboxes and associates each recommended item with a "recommendation strength" which may represent, for example, a similarity score determined for each recommended item. Control 1310 may be selected to view previously-presented user interface 1200, while control 1320 may be selected to Add any items associated with a selected checkbox to a cart as described above. Embodiments may also incorporate user feedback into the determination of future recommendations. Such user feedback may be generated and received with respect to recommended items presented to a user. For example, user selection of a recommended item may be detected and incorporated into future determinations of recommended items. Conversely, user viewing of a presented recommended item for a threshold amount of time without selecting the item may be incorporated into future determinations as negative feedback. Some embodiments may provide a "Discard Recommendation" control, and user selection thereof may result in strong negative feedback incorporated into the generation of future recommendations.

Figure 14:
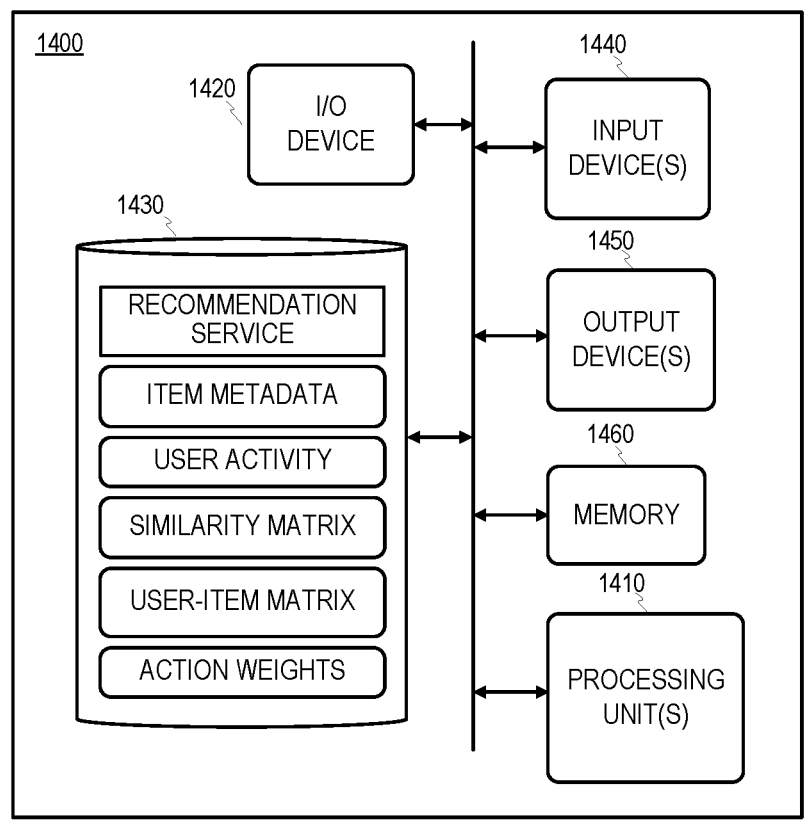
FIG. 14 is a block diagram of a hardware system to determine and provide item recommendations according to some embodiments.

Hardware system 1400 shown in FIG. 14 may comprise a general-purpose computing apparatus and may execute program code to perform any of the functions described herein. Hardware system 1400 may be implemented by a distributed cloud-based server and may comprise an implementation of recommendation service 130 that uses blind signatures in some embodiments. Hardware system 1400 may include other unshown elements according to some embodiments.

Hardware system 1400 includes processing unit(s) 1410 operatively coupled to I/O device 1420, data storage device 1430, one or more input devices 1440, one or more output devices 1450 and memory 1460. Communication device 1420 may facilitate communication with external devices, such as an external network, the cloud, or a data storage device. Input device(s) 1440 may comprise, for example, a keyboard, a keypad, a mouse or other pointing device, a microphone, knob or a switch, an Infra-Red ("IR") port, a docking station, and/or a touch screen. Input device(s) 1440 may be used, for example, to enter information into hardware system 1400. Output device(s) 1450 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory ("ROM") devices, and Random Access Memory ("RAM") devices, while memory 1460 may comprise a RAM device.

Data storage device 1430 stores program code executed by processing unit(s) 1410 to cause system 1400 to implement any of the components and execute any one or more of the processes described herein. Embodiments are not limited to execution of these processes by a single computing device. Data storage device 1430 may also store data and other program code for providing additional functionality and/or which are necessary for operation of hardware system 1400, such as device drivers, operating system files, etc.

Thus, embodiments may provide a solution for which traceability to a user in a recommendation setup is not possible. The system still validates the user, but this ability does not lead to traceability of the user. That is, although the system knows that the user is a valid user in the system, there is no way to trace back information back to the actual user and/or user attributes. By using blind signatures combined with a blind trust, embodiments may achieve a delinking of user details from the usage of a user identifier in a transaction.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system, comprising:
   at least one programmable processor; and
   a non-transitory machine-readable medium storing instructions that, when executed by the at least one programmable processor, cause the at least one programmable processor to perform operations comprising:
   receiving, from a user, an onboarding request to utilize a recommendation service, the onboarding request comprising personal data, including an onboarding user identifier and a serial number requesting a stated number of credits, encrypted with a commuting function C, along with clear text account details,
   establishing a blind trust with the user,
   signing the onboarding request with a signing function S and sending the signed onboarding request to the user to perform a blind onboarding of the user to the recommendation service; and
   receiving, from the user, a consumption request including a consumption user identifier and an approved credits document signed by the recommendation service,
   updating a user-item matrix that maps user identifiers with available items, and
   transmitting an item recommendation to the user, based on the user-item matrix, and expiring the approved credits document by a consumption amount.

2. The system of claim 1, wherein the signing function S is only known to the recommendation service and an inverse signing function S' is publicly known.

3. The system of claim 2, wherein the commuting function C and an inverse commuting function C' are only known to the user.

4. The system of claim 3, wherein $C'(S(C(x))) \rightarrow S(x)$.

5. The system of claim 4, wherein the encrypted personal data received from the user further includes at least one of: a user name, a user address, a user age, and a user preference.

6. The system of claim 4, wherein the user applies the inverse signing function S' to the signed request sent from the recommendation service to obtain the approved credits document, without encryption, signed by the recommendation service.

7. The system of claim 4, wherein establishing a blind trust with the user comprises:
   receiving, from the user, a plurality of onboarding requests to utilize the recommendation service, each onboarding request including personal data, with different onboarding user identifiers and serial numbers requesting the stated number of credits, encrypted with a commuting function C,
   randomly selecting one of the plurality of onboarding requests,
   requesting, from the user, decryption keys for all of the plurality of onboarding requests except the randomly selected one, and
   verifying that every serial number requests the same stated number of credits, wherein the randomly selected onboarding request is signed with the signing function S and sent to the user to perform a blind onboarding of the user to the recommendation service.

8. The system of claim 1, wherein the user-item matrix comprises a sparse matrix of values associated with a probable affinity of each user toward each item.

9. A method, comprising:
   receiving, at a computer processor from a user, an onboarding request to utilize a recommendation service, the onboarding request comprising personal data, including an onboarding user identifier and a serial number requesting a stated number of credits, encrypted with a commuting function C, along with clear text account details;
   establishing a blind trust with the user;
   signing the onboarding request with a signing function S and sending the signed onboarding request to the user to perform a blind onboarding of the user to the recommendation service, and
   receiving, from the user, a consumption request including a consumption user identifier and an approved credits document signed by the recommendation service;
   updating a user-item matrix that maps user identifiers with available items; and
   transmitting an item recommendation to the user, based on the user-item matrix, and expiring the approved credits document by a consumption amount.

10. The method of claim 9, wherein the signing function S is only known to the recommendation service and an inverse signing function S' is publicly known.

11. The method of claim 10, wherein the commuting function C and an inverse commuting function C' are only known to the user.

12. The method of claim 11, wherein $C'(S(C(x))) \rightarrow S(x)$.

13. The method of claim 12, wherein the encrypted personal data received from the user further includes at least one of: a user name, a user address, a user age, and a user preference.

14. The method of claim 12, wherein the user applies the inverse signing function S' to the signed request sent from the recommendation service to obtain the approved credits document, without encryption, signed by the recommendation service.

15. A non-transitory medium storing processor-executable program code executable by a processing unit of a computing system to cause the computing system to:
- receive, from a user, an onboarding request to utilize a recommendation service, the onboarding request comprising personal data, including an onboarding user identifier and a serial number requesting a stated number of credits, encrypted with a commuting function C, along with clear text account details;
- establish a blind trust with the user;
- sign the onboarding request with a signing function S and sending the signed onboarding request to the user to perform a blind onboarding of the user to the recommendation service;
- receive, from the user, a consumption request including a consumption user identifier and an approved credits document signed by the recommendation service;
- update a user-item matrix that maps user identifiers with available items; and
- transmit an item recommendation to the user, based on the user-item matrix, and expire the approved credits document by a consumption amount.

16. The medium of claim 15, wherein establishing the blind trust is performed by having the computer system:
- receive, from the user, a plurality of onboarding requests to utilize the recommendation service, each onboarding request including personal data, with different onboarding user identifiers and serial numbers requesting the stated number of credits, encrypted with a commuting function C;
- randomly select one of the plurality of onboarding requests;
- request, from the user, decryption keys for all of the plurality of onboarding requests except the randomly selected one; and
- verify that every serial number requests the same stated number of credits, wherein the randomly selected onboarding request is signed with the signing function S and sent to the user to perform a blind onboarding of the user to the recommendation service.

17. The medium of claim 15, wherein the user-item matrix comprises a sparse matrix of values associated with a probable affinity of each user toward each item.

* * * * *